April 20, 1937.   P. B. STREANDER   2,077,907
MEANS FOR TREATING SEWAGE, INDUSTRIAL WASTES, AND THE LIKE
Filed May 14, 1935   2 Sheets-Sheet 1
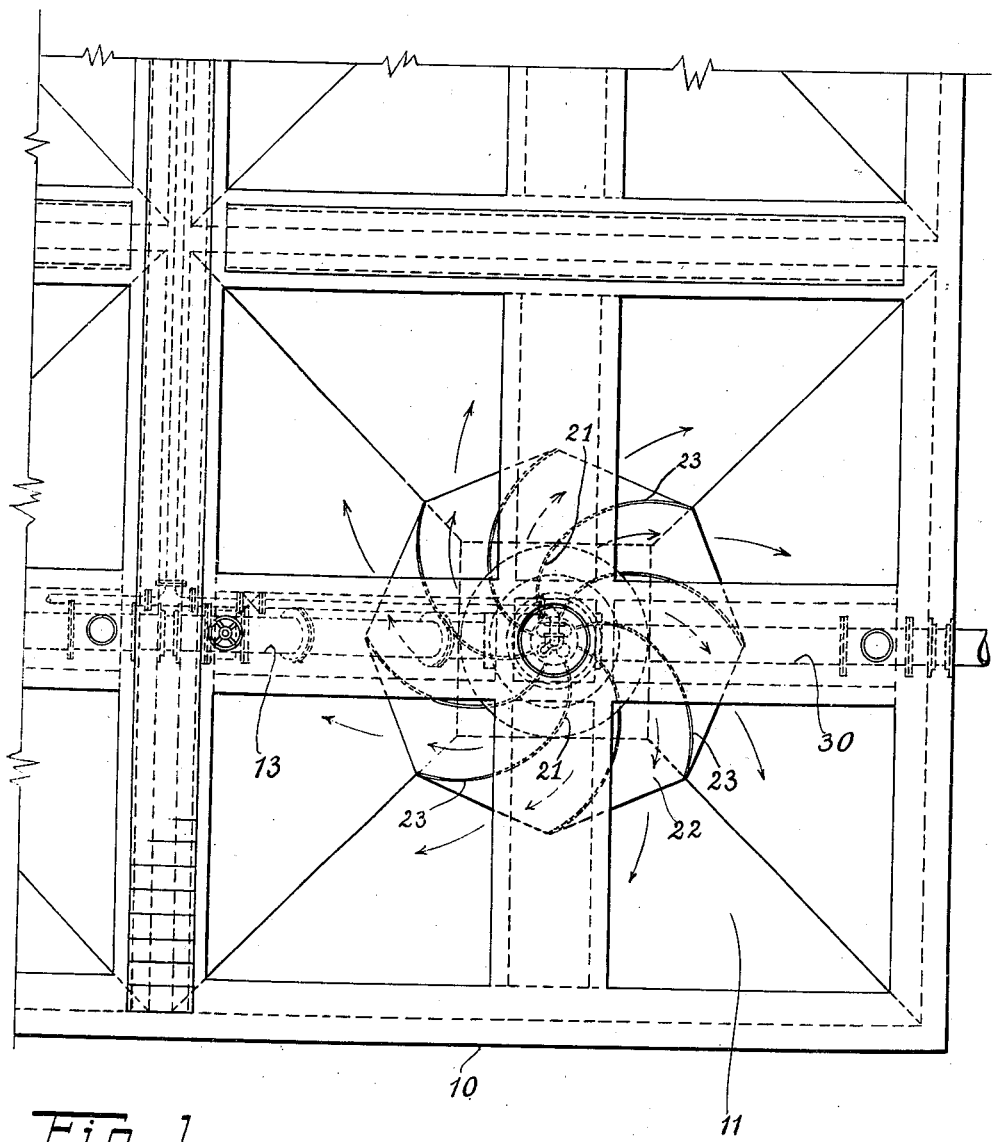
Fig-1-
PHILIP B STREANDER
INVENTOR.
BY Louis L. Ansart
his   ATTORNEY.

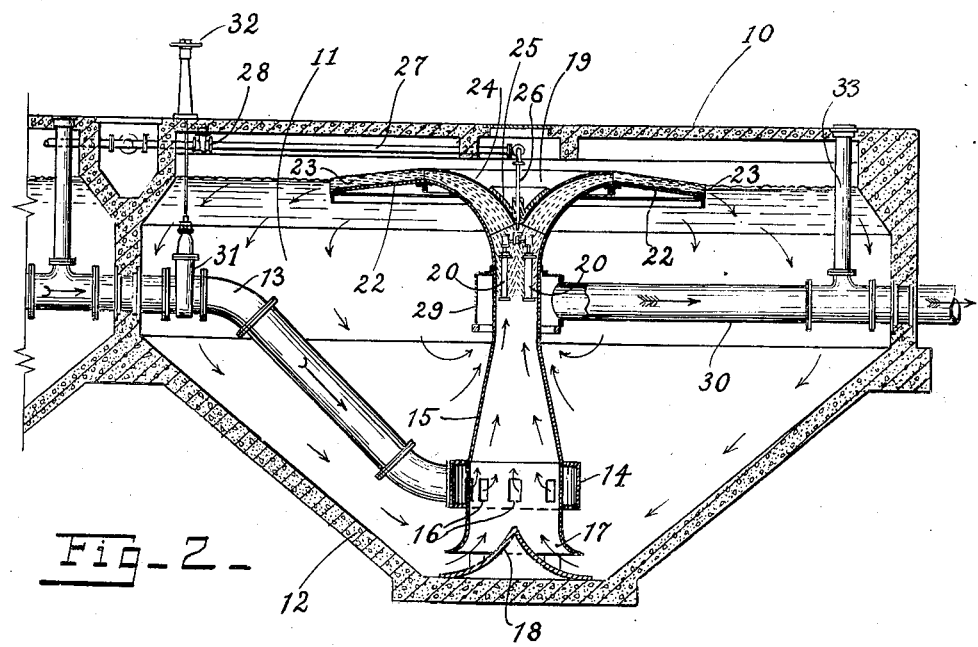
Fig-2-
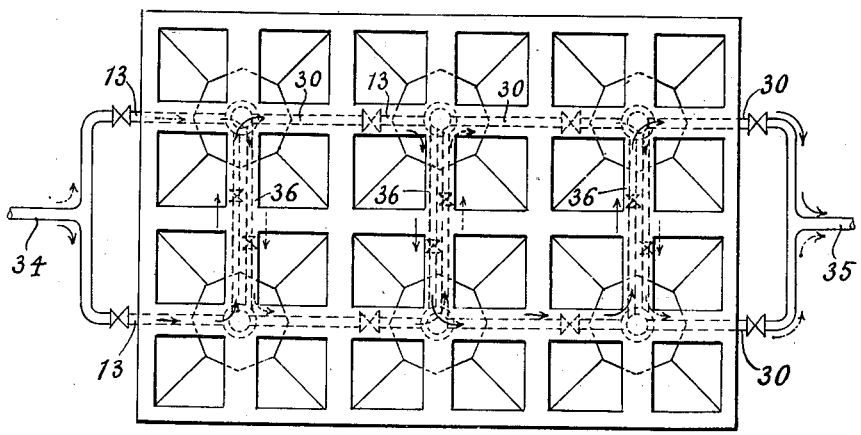
Fig-3-
PHILIP B. STREANDER
INVENTOR.
BY Louis L. Ansart
ATTORNEY.

Patented Apr. 20, 1937

2,077,907

UNITED STATES PATENT OFFICE 2,077,907

MEANS FOR TREATING SEWAGE, INDUSTRIAL WASTES, AND THE LIKE

Philip B. Streander, Scarsdale, N. Y., assignor, by mesne assignments, to Underpinning & Foundation Company, Inc., New York, N. Y., a corporation of New York Application May 14, 1935, Serial No. 21,378

5 Claims. (Cl. 210—8)

This invention relates to methods of and means for the treatment of sewage, industrial wastes and the like and the main objects of the invention relate to the provision of novel and advantageous methods of and means for such purposes.

An important feature of the invention resides in the provision of a flocculation unit in which previously aerated and flocculated sewage is constantly mixed with raw sewage or less thoroughly aerated and flocculated sewage entering the tank thereby causing a rapid aggrandizement of the smaller floc in the entering sewage, the upward movement of the mixed material through the center of the unit during such mixing, the distribution of the mixture in an outward spiral on the surface of the liquid in the tank so as to impart a slow downward spiralling motion to the sewage in the tank for later mixing with freshly introduced sewage, and the withdrawal of treated sewage from the upper and central part of the tank around the upwardly flowing stream of liquid but separated therefrom. The downward spiral movement in the unit or tank taken in connection with the central withdrawal of treated liquid assures the avoidance of dead spots in the tank, and the central withdrawal avoids tendencies to short circuiting which would arise from the withdrawal of effluent from the surface of the liquid in the tank.

The upward movement of the liquid at the middle of the tank or unit may be through a suitable draft tube and the outward spraying of the liquid at the top of the draft tube, while it may be effected by means of a rotating spray head, is preferably effected by an air-lift device in connection with a stationary spray head having suitably curved or inclined vanes.

The sewage, which may be settled raw sewage or treated sewage, flows to the tank or unit and enters the lower part of the circulating draft tube, where it is mixed with previously aerated sewage having a higher degree of activity and the mixture flows upwardly in the draft tube. Circulation of the sewage is produced by the action of an air lift head built in the upper part of the draft tube. The air lift head preferably comprises a suitable number of porous tubes suspended above the throat of the draft tube, the number required depending upon the capacity of the aerators. Air is blown through the diffusor tubes and is discharged from the tube in air bubbles of minute size which diffuse through the sewage giving an emulsion of air and sewage lighter than the corresponding column of liquid outside of the tube and thereby causing the liquid in the tank to flow into the bottom of the draft tube.

The intensity of this action depends upon the amount of air blown through the liquid, which is controlled by the required rate of recirculation. The air lift head is expanded beyond the air diffusors to provide added volume for an expansion to eliminate throttling of the air and liquid mixture and to cause a gradual lessening of the velocity toward the peripheral exit. The air lift head is also provided with a series of vanes curved so as to impart a rotary motion to the issuing mixture of air and liquid. The rotary motion of the mixture of air and liquid is further continued over a splash plate provided with a series of curved dispersion vanes attached to the splash plate. The splash plate and diversion vanes are designed to thoroughly disperse the liquid over a substantial area of the tank and the rotary motion of the issuing liquid imparts a slow rotary motion to the liquid in the tank which therefore flows downwardly in a slow spiralling motion into the inlet end, or a recirculant entrance port, of the draft tube. The effluent or discharge from each tank is withdrawn by means which may be in the form of a pipe extending from a bonnet or hood built around the circulation draft tube.

Under certain conditions of operation, chemical flocculation of the colloidal and pseudo-colloidal solids, for example in raw sewage, is more effectively accomplished by what might be termed "stage-flocculation". This consists of first forming floc to agglutinate the higher forms or sizes of solids, then diffusing this thorughout the sewage by breaking up the floc and finally the reflocculation of the dispersed and semi-dissolved floc by means of which the finer forms or sizes of solids are agglutinated and aggrandized. With the central feed aerator the first stage in this method of flocculation takes place in the updraft tube where chemically treated raw sewage is mixed with previously flocculated sewage in any required proportion. Preferably the influent sewage is fed into the draft tube above the recirculation inlet at the lower end of the draft tube. The second stage or the dispersion and diffusion of the floc takes place in the combined lifting device and spray head, which in the air lift form aerates the sewage by spraying it through the atmosphere in a spiralling path. The third stage, or reflocculation, takes place in the upper portion of the tank and is assisted by the spiralling downward motion of the sewage through the tank caused by the method of dispersing the liquid at the surface. A portion of the reflocculated sewage enters the effluent bonnet and is discharged through the effluent pipe. Therefore this method and the equipment provided is continuous in the flocculation, dispersion and diffusion, with or without aeration, and in the reflocculation of the sewage producing thereby a full flocculation of colloidal and pseudo-collodial solids. It should be understood that broad features of the invention may also be carried out in apparatus in which the lifting of the sewage in the draft tube and the spraying of the sewage on the surface of that in the tank is effected mechanically by means including a rotary head.

An important application of the central feed air actuated aerators is in connection with the coagulation and aeration of sewage in the chemical precipitation process. Heretofore, in other forms of flocculation tanks, an attempt has been made to cause the return of the former floc and the mixing thereof with partly formed floc by mechanical, but the action is progressively intermittent and does not allow the return of fully formed floc to the entering raw sewage. In contradistinction to this, the apparatus of the present invention enables the return of fully formed chemical floc, before it has changed its form and reaction, and the mixing of such floc with the chemically treated raw sewage serves to accelerate the agglutination and aggrandizement of the colloidal matter or the rate and efficiency of floc formation, and results in the formation of a more rapidly settling floc or coagulum. The formation of ferric hydroxide in such sewage treatment is dependent on the presence of oxygen as well as the hydroxylion, and the addition of minute bubbles of air to the sewage, during its passage through the air lift head of the draft tube, serves to partially meet the oxygen demand of the entering raw sewage and also to oxidize materials, such as ferrous salt, added as the coagulant and to maintain this in a state of oxidation. The central feed air actuated aerator meets the requirements for oxygen absorption by the sewage and in the return of fully formed floc to the entering raw sewage to which the coagulating chemicals have been added. It should be understood that the slow downward spiralling movement is very effective in the formation of large floc particles.

Preferably, for the activated sludge process, there would be used a plurality of tanks operating in series or in parallel series. In carrying out such a process previously activated sludge is added to and mixed with settled raw sewage which is then passed to one of the tanks, usually the first one. Under some conditions the first tank might be used as a plain aeration tank in which the toxic gases present in the sewage could be driven off, and the sludge would be returned to and mixed with the sewage entering the second tank. The sludge could also be returned to one or more compartments at various rates so as best to meet the conditions of sludge utilization for oxidation purposes.

The effluent from the first tank would be discharged from the effluent bonnet at the center through a pipe into the draft tube of the second tank where it again would be mixed with the contents of this tank and aerated to meet the oxygen demand prevailing at this point. This same procedure would be followed in the remaining tanks and the effluent from the last tank would be discharged into a so-called final settling tank in which the activated sludge would be separated from the sewage liquid and returned to and mixed with the entering sewage in whatever proportion required to properly treat the sewage. With this arrangement of tanks and the design of the aerating and mixing apparatus providing positive circulation of sewage through the tanks and in each tank, the process of treatment is divided into progressively forward steps.

The principal advantages obtained with the use of this apparatus and arrangement of tanks are the positive and thorough mixing of the sewage from one tank with that of the succeeding tank, the elimination of the dormant sections in the tanks by the removal of the sewage from the tank at the center, the elimination of short circuiting of sewage from one tank to another as is done by surface inlets and outlets, the elimination of interference with recirculation by the manner of introducing the influent and removing the effluent, the aeration effected by the diffusion of minute air bubbles throughout the sewage with the consequent partial absorption of the oxygen contained in the air bubbles, the absorption of atmospheric oxygen by the rolling action agitation effected by the dispersion vanes on the splash plates, the surface absorption of oxygen effected by the breaking of the myriad air bubbles contained in the mixture of air and sewage as this reaches the surface of the sewage in the tank and flows spirally outwardly from the splash plate, the mixing of more thoroughly aerated and flocculated sewage in the tank with less aerated and flocculated sewage entering the tank causing thereby a rapid aggrandizement of the smaller floc in the entering sewage.

Instead of arranging the flocculation or aeration tanks in one battery as previously described, these tanks could be separated by a settling tank imposed between what would then be two batteries of tanks. This arrangement would then consist of a so-called primary settling tank in which the heavier solids would be deposited, a first battery of aeration tanks, a secondary settling tank, a second battery of aeration tanks and a final settling tank. Such an arrangement allows the selective grading of activated sludge action on the more finely divided suspended solids in the first battery of aeration tanks and on the colloidal solids in the second battery of aeration tanks. Activated sludge would be returned from the secondary and final settling tanks and mixed with sewage entering the first and second aeration tank batteries respectively. The action of the returned activated sludge, being partly chemical in its reaction with the sewage solids, could be augmented and accelerated by the addition of proper coagulating chemical to the sewages entering the two aeration tank batteries.

Other objects, features and advantages will appear upon consideration of the following description and of the drawings, in which Fig. 1 is a top plan view of an aeration unit embodying an approved form of the invention;

Fig. 2 is a central vertical section of the aeration unit shown in Fig. 1; and

Fig. 3 is a plan view of a plant comprising a plurality of aeration units.

Referring to the drawings, reference numeral 10 designates an aeration unit comprising a tank 11 with a hopper bottom 12. The sewage is introduced into each tank through an influent pipe 13 and flows therefrom into an annular chamber 14 around the lower part of a central draft tube 15 and communicating therewith through ports 16. In the draft tube the influent sewage is mixed with previously aerated sewage entering the lower end of the circulating draft tube through recirculation entrance port or ports 17 over a hydraulic cone 18 which causes an easy change in direction of flow from the tank 11 into the draft tube. The draft tube is conically shaped upwardly to its throat on the bottom of the spray head which is preferably an air lift head 19 comprising a suitable number of porous air diffusor tubes 20 suspended above the throat of the draft tube 15, the number of tubes required depending upon the capacity of the aeration unit or aerator. Air is blown through the diffusor tubes and is discharged therefrom in air bubbles of minute size which diffuse through the sewage, thus providing an emulsion of air and sewage.

This emulsion, being lighter than the corresponding column of liquid outside of the tube, rises and draws the liquid in the tank into the bottom of the draft tube 15, the intensity of this action depending upon the amount of air blown through the liquid, as determined by the required rate of recirculation. Above the air diffusors, the air lift head 19 is expanded to provide added volume for expansion to eliminate throttling of the air and liquid mixture and to cause a gradual lessening of velocity toward the peripheral outlet. Also the lift head is also provided with a series of vanes 21 curved so as to impart a rotary motion to the rising mixture of air and liquid, this rotary motion being further continued over an annular splash plate 22 provided with a series of curved dispersion vanes 23 attached to the splash plate and preferably forming continuations of vanes 21 of the air lift head. The lift head also comprises a top 24 in the form of an inverted hydraulic cone which may be supported by the vanes 21 and a generally conical reinforcing member 25 through which passes a compressed air duct or pipe 26 supplying air from a pipe 27 of the main supply system, under control of a valve 28 to the diffusor tubes 20.

The splash plate 22 and its dispersion vanes 23 are designed to thoroughly disperse the liquid over a substantial area of the surface of the liquid in the tank and the rotary motion of the liquid issuing from the vanes 23 imparts a slow rotary motion to the liquid in the tank which therefore flows downwardly in a slow spiralling motion into the inlet or recirculation port 17 of the draft tube 15. As the recirculating liquid passes upwardly in the draft tube, liquid from the annular influent chamber 14 is drawn through the ports 16 into the draft tube and mixed with the recirculated liquid.

The effluent or discharge liquid from each tank passes upwardly into an annular bonnet or hood 29, surrounding the draft tube 15 near its top, and from the hood 29 through a pipe 30 passing through a wall of the tank either to discharge the effluent into another tank or for disposal in other ways.

The rate of circulation in the tank, the draft tube and the air lift head is many times the rate of sewage inflow to the tank so that the entering sewage is continuously dispersed throughout the full volume of the tank. The taking of the effluent from the central and upper part of the tank causes a slow broad movement toward the effluent bonnet 29, thereby keeping in motion the liquid at the central portion of the tank which would otherwise be more or less dormant.

Just inside each tank, the influent pipe 13 may be provided with a suitable valve 31 controlled by suitable means, such as a hand wheel 32, at the top of the tank. Also the effluent pipe 30 may be provided with a sampling tube 33 extending to the top of the tank.

Although very satisfactory results are obtained by use of the air lift head, which involves additional aeration due to the air supplied from the diffusor tubes 20, it should be understood that satisfactory results may also be obtained by using a mechanical aerator head, for example a rotary head substantially submerged at the surface of the liquid in the tank.

The operation of a single unit is substantially as follows: Upon opening the valve 28 to a suitable extent air will pass to the diffusor tubes 20 and will be discharged or blown therefrom in air bubbles of minute size which will diffuse through the sewage giving an emulsion of air and sewage. This emulsion being lighter than the liquid in the tank, the latter will flow into the bottom of the draft tube and the emulsion as fast as formed will pass upwardly and outwardly through the air lift head 19 and then outwardly over the splash plate 22. As the sewage from the tank flows upwardly through the draft tube, influent liquid will flow through the ports 16 into the draft tube due to a higher liquid level outside the tank 11, to the drawing action of the upward current in the draft tube or both. The curved vanes 21 of the air lift 19 and the diversion vanes 23 of the splash plate 22, which vanes 23 constitute extensions of the vanes 21, cause a thorough dispersion of the issuing liquid over a substantial part of the surface of the liquid in the tank, and the rotary motion of the issuing liquid imparts a slow rotary motion to the liquid in the tank which therefore flows downwardly in a slow spiralling motion into the inlet port 17 at the lower end of the draft tube 15. Part of the liquid in the tank flows upwardly into the bonnet 29 and outwardly through the effluent duct 30 which passes through a side wall of the tank, the bonnet being of such dimensions and so located as to maintain circulation of the liquid in the central part of the tank and prevent dead spots. The influent duct 13 enters the tank at substantially the same level as the effluent duct passed out of the tank, thereby facilitating the use of two or more tanks in series.

It is important to adjust the rate of aeration and recirculation in each tank in proportion to the rate of supply of influent sewage. Such adjustment may be made by means of valve 28.

In Fig. 3 there is illustrated diagrammatically a battery of six units which can be operated in one complete series or in two parallel series. There are two rows of units 10 to which sewage is supplied from a main influent line 34 and two branches 13 to the units at the adjacent ends of the two rows. The sewage may be withdrawn from the units at the other end of the battery in substantially the same way, that is through two branches or ducts 30 discharging into a main effluent duct 35. There are also transverse connections 36 each of which would involve two ducts one serving to take the effluent of the unit at one side and delivering as influent sewage at the other side and the other furnishing the same facilities in the opposite direction.

The battery of units 10, while suitable for use for some other purposes, is of especial value in connection with activated sludge work, and the various units may be arranged as desired within the limits of effective use and service. After leaving the duct 35, the effluent may be settled and aerated if desirable. The settled activated sludge may be introduced in suitable amounts in different tanks of the battery, as required. Settled raw sewage would be supplied through the influent duct 34 to the draft tube of one or more aeration tanks or units and previously activated sludge would be returned from a final settling operation and mixed with the entering settled raw sewage. Or the first tank of a series could be used as a plain aertion tank in which the toxic gases present in the sewage, which have a deleterious effect on the delicate organisms in the returned sludge, could be driven off. In this case the activated sludge could be introduced into a unit coming later in the series. Also the sludge could be returned to one or more compartments at various rates so as to best meet the requirements for effective utilization of sludge for oxidation purposes.

It should be understood that changes may be made in different features of the invention and that certain features may be used without others, without departing from the true scope and spirit of the invention.

Having thus described my invention, I claim:

1. In a flocculation unit, the combination with a tank and a central draft tube receiving at its lower end liquid from the tank, of means at the upper end of said tube to draw up liquid through the tube and distribute it over the surface of the liquid in the tank, and means for introducing influent into the lower part of the draft tube for mixing with the upwardly flowing liquid from the tank, such influent-introducing means including a chamber surrounding said draft tube adjacent its lower end and a perforated portion of said draft tube at the inner side of said chamber.

2. In a flocculation unit, the combination with a tank and a central draft tube receiving through its lower end liquid from the lower part of said tank, of means to pass liquid upwardly through the tube and distribute it over the surface of the liquid in the tank, means for introducing influent liquid into the lower part of the draft tube above its lower end for mixing with the upwardly flowing liquid from the tank, and means for withdrawing flocculated effluent through a relatively small outlet at the central part of the tank so as to prevent dead spots in the central part of the tank, said means including a bonnet with a closed top surrounding the draft tube and providing a narrow annular inlet through which the normal flow through the tank will pass with substantial velocity, and a duct leading from said bonnet to the outside of said tank.

3. The combination of two sets of flocculation units, the sets being arranged in parallel and the units in each set being arranged in series, influent ducts leading to the initial units in the two sets, effluent ducts leading from the final units in the two sets, valves for shutting off the flow through said influent ducts and said effluent ducts, pairs of ducts connecting corresponding units of the two sets to enable flow in either direction, one duct of each pair receiving liquid from the upper central part of one of the units connected thereby and delivering it to the lower central part of the other of the units connected thereby and the other duct of the pair connecting the two units in reverse manner, and valves in the ducts of said pairs and between successive units of said sets, whereby the flow of liquid through the flocculation units may be varied as desired.

4. In flocculation apparatus for treating liquid, two flocculation units arranged in series, each comprising a tank, an upright draft tube for each of said tanks receiving at its lower end liquid from said tank, a distributing head at the top of each of said draft tubes, an air diffuser in the upper part of each of said draft tubes at the entrance to the corresponding head, means including a duct to introduce outside liquid into the lower part of the draft tube of the first unit of the series, means for withdrawing treated liquid from the upper central part of the first tank and delivering it to the lower part of the draft tube of the second unit, and means for taking treated liquid from the upper central part of the second tank and discharging it to the outside of said second tank.

5. In a flocculation unit, the combination with a tank, a central draft tube and means for passing liquid upwardly through said draft tube and distributing it over the surface of the tank whereby liquid will be circulated upwardly through the draft tube and downwardly at the sides of the tank, of means for introducing influent liquid into the lower part of the draft tube, and means for withdrawing the liquid with flocculated material therein from the central part of the tank so as to maintain a mixing and circulating action in the central part of the tank.

PHILIP B. STREANDER.